(12) United States Patent
Barnum

(10) Patent No.: US 9,762,881 B2
(45) Date of Patent: Sep. 12, 2017

(54) REDUCING DISPARITY AND DEPTH AMBIGUITY IN THREE-DIMENSIONAL (3D) IMAGES

(71) Applicant: Texas Instruments Incorporated, Dallas, TX (US)

(72) Inventor: Peter Charles Barnum, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 445 days.

(21) Appl. No.: 13/664,374

(22) Filed: Oct. 30, 2012

(65) Prior Publication Data

US 2013/0113881 A1   May 9, 2013

Related U.S. Application Data

(60) Provisional application No. 61/555,377, filed on Nov. 3, 2011.

(51) Int. Cl.
*H04N 13/00* (2006.01)
*G06T 5/00* (2006.01)
*G06T 7/593* (2017.01)

(52) U.S. Cl.
CPC ......... *H04N 13/0018* (2013.01); *G06T 5/001* (2013.01); *G06T 7/593* (2017.01); *H04N 2213/003* (2013.01)

(58) Field of Classification Search
CPC .. H04N 13/0018; H04N 13/004; H04N 13/00; H04N 13/0022; H04N 13/007; H04N 13/0232; G06T 7/0075; G06T 5/001; G06T 7/0065; G06T 15/20; G06T 7/002; G06T 15/10; G02B 27/0075; G06K 9/00
See application file for complete search history.

(56) References Cited

U.S. PATENT DOCUMENTS

| | | | |
|---|---|---|---|
| 8,619,082 B1* | 12/2013 | Ciurea et al. | 345/427 |
| 2009/0022393 A1* | 1/2009 | Bar-Zohar et al. | 382/154 |
| 2012/0321172 A1* | 12/2012 | Jachalsky et al. | 382/154 |
| 2013/0272582 A1* | 10/2013 | Schlosser et al. | 382/107 |

OTHER PUBLICATIONS

Yang et al A novel line scan clustering algorithm for identifying connected components in digital images, Image and Vision Computing 21 (2003) p. 459-472.*

(Continued)

*Primary Examiner* — Frank Huang
(74) *Attorney, Agent, or Firm* — Gregory J. Albin; Charles A. Brill; Frank D. Cimino

(57) ABSTRACT

A method for three dimensional (3D) image processing is provided that includes receiving an image, wherein each location in the image includes a value indicative of a depth of a pixel in a scene and wherein each value has an associated confidence measure, determining whether each similarity region of a plurality of non-overlapping similarity regions in the image is valid or invalid based on a number of values in the similarity region having sufficiently high confidence measures, wherein a similarity region includes contiguous locations in the image having similar values, and indicating that the values in a similarity region are invalid when the similarity region is determined to be invalid.

18 Claims, 7 Drawing Sheets

(56) References Cited

OTHER PUBLICATIONS

Leila Shafarenko and Josef Kittler, "Automatic Watershed Segmentation of Randomly Textured Color Images", IEEE Transactions on Image Processing, vol. 6, No. 11, Nov. 1997, pp. 1530-1544.
Chad Carson et al., "Blobworld: Image Segmentation using Expectation-Maximization and its Application to Image Querying", IEEE Transactions on Pattern Analysis and Machine Intelligence, vol. 24, Issue 8, Aug. 2002, pp. 1026-1038.
Yuri Boykov and Gareth Funka—Lea, "Graph Cuts and Efficient N-D Image Segmentation", International Journal of Computer Vision, vol. 70, Issue 2, Nov. 2006, pp. 109-131.
Thrasyvoulos N. Pappas, "An Adaptive Clustering Algorithm for Image Segmentation", IEEE Transactions on Signal Processing, vol. 40, No. 4, Apr. 1992, pp. 901-914.
D. Marr and E. Hildreth, "Theory of Edge Detection", Proceedings of the Royal Society of London, Series B, Biological Sciences, vol. 207, No. 1167, Feb. 29, 1980, pp. 187-217.
Filip Mroz and Toby P. Breckon, "An Empirical Comparison of Real-Time Dense Stereo Approaches for Use in the Automotive Environment", EURASIP Journal on Image and Video Processing 2012, Aug. 16, 2012, pp. 1-40.
Xiaoyan Hu and Philippos Mordohai, "Evaluation of Stereo Confidence Indoors and Outdoors", 2010 IEEE Conference on Computer Vision and Pattern Recognition (CVPR), Jun. 13-18, 2010, pp. 1466-1473.
Peter Charles Barnum and Goksel Dedeoglu, "Scene Adaptive Filter Design for Improved Stereo Matching", U.S. Appl. No. 13/647,449, filed Oct. 9, 2012, pp. 1-47.
Soo-Chang Pei and Ji-Hwei Horng, "Design of FIR Bilevel Laplacian-of-Gaussian Filter," Journal Signal Processing, vol. 82, Issue 4, Apr. 2002, pp. 677-691.
Heiko Hirschmüller, "Stereo Processing by Semiglobal Matching and Mutual Information," IEEE Transactions on Pattern Analysis and Machine Intelligence, vol. 30, No. 2, Feb. 2008, pp. 328-341.
Daniel Scharstein and Richard Szeliski, "A Taxonomy and Evaluation of Dense Two-Frame Stereo Correspondence Algorithms", International Journal of Computer Vision, vol. 47, Issue 1-3, Apr.-Jun. 2002, pp. 7-42.

* cited by examiner

REDUCING DISPARITY AND DEPTH AMBIGUITY IN THREE-DIMENSIONAL (3D) IMAGES

CROSS-REFERENCE TO RELATED APPLICATIONS

This application claims benefit of U.S. Provisional Patent Application Ser. No. 61/555,377, filed Nov. 3, 2011, which is incorporated herein by reference in its entirety.

BACKGROUND OF THE INVENTION

Field of the Invention

Embodiments of the present invention generally relate to refinement of disparity or depth images in three-dimensional (3D) image processing.

Description of the Related Art

Objects at different depths in the scene of a stereoscopic video sequence will have different displacements, i.e., disparities, in left and right frames of the stereoscopic video sequence, thus creating a sense of depth when the stereoscopic images are viewed on a stereoscopic display. The term disparity refers to the shift that occurs at each pixel in a frame between the left and right images due the different perspectives of the cameras used to capture the two images. The amount of shift or disparity may vary from pixel to pixel depending on the depth of the corresponding 3D point in the scene.

In many stereo vision applications, it is important to know the depths of objects in a scene. The depth information for a stereo frame or image is typically computed from the disparities between the pixels in the left image and corresponding pixels in the right image because depth is proportional to the reciprocal of the disparity. These disparities are typically communicated in the form of a disparity map or image that records the disparity of each pixel as a horizontal shift amount between corresponding pixels in the two images. To determine the disparities, a stereo matching algorithm, also referred to as a stereo correspondence algorithm is used.

The computation of stereo correspondence between a left-right image pair typically results in some pixel matches that are erroneous or ambiguous due to factors such as the inherent imprecision in the measurement of light intensity of the imaging systems capturing the stereo images, the presence of low or no texture objects in the scene, occlusion, background video, etc. Errors and ambiguity in matching occur even when stereo matching algorithms are used that consider the factors that can introduce error and ambiguity during the match computation. The errors and ambiguity are manifested as noise in the disparity image. Therefore, in many applications, the disparity image is refined to attempt to detect and suppress the noise. Common refinement techniques operate on a per-pixel basis, using confidence scores and thresholds to detect and suppress errors. Such per-pixel techniques may suppress ambiguous yet otherwise accurate measurements by error.

SUMMARY

Embodiments of the present invention relate to methods, apparatus, and computer readable media for reducing disparity and depth ambiguity in three dimensional (3D) images. In one aspect, a method for three dimensional (3D) image processing is provided that includes receiving an image, wherein each location in the image includes a value indicative of a depth of a pixel in a scene and wherein each value has an associated confidence measure, determining whether each similarity region of a plurality of non-overlapping similarity regions in the image is valid or invalid based on a number of values in the similarity region having sufficiently high confidence measures, wherein a similarity region includes contiguous locations in the image having similar values, and indicating that the values in a similarity region are invalid when the similarity region is determined to be invalid.

In one aspect, an apparatus configured to perform three dimensional (3D) image processing is provided that includes means receiving an image, wherein each location in the image includes a value indicative of a depth of a pixel in a scene and wherein each value has an associated confidence measure, means for determining whether each similarity region of a plurality of non-overlapping similarity regions in the image is valid or invalid based on a number of values in the similarity region having sufficiently high confidence measures, wherein a similarity region includes contiguous locations in the image having similar values, and means for indicating that the values in a similarity region are invalid when the similarity region is determined to be invalid.

In one aspect, a non-transitory computer readable medium storing software instructions is provided. The software instructions, when executed by a processor, cause the performance of a method for three dimensional (3D) image processing that includes receiving an image, wherein each location in the image includes a value indicative of a depth of a pixel in a scene and wherein each value has an associated confidence measure, determining whether each similarity region of a plurality of non-overlapping similarity regions in the image is valid or invalid based on a number of values in the similarity region having sufficiently high confidence measures, wherein a similarity region includes contiguous locations in the image having similar values, and indicating that the values in a similarity region are invalid when the similarity region is determined to be invalid.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
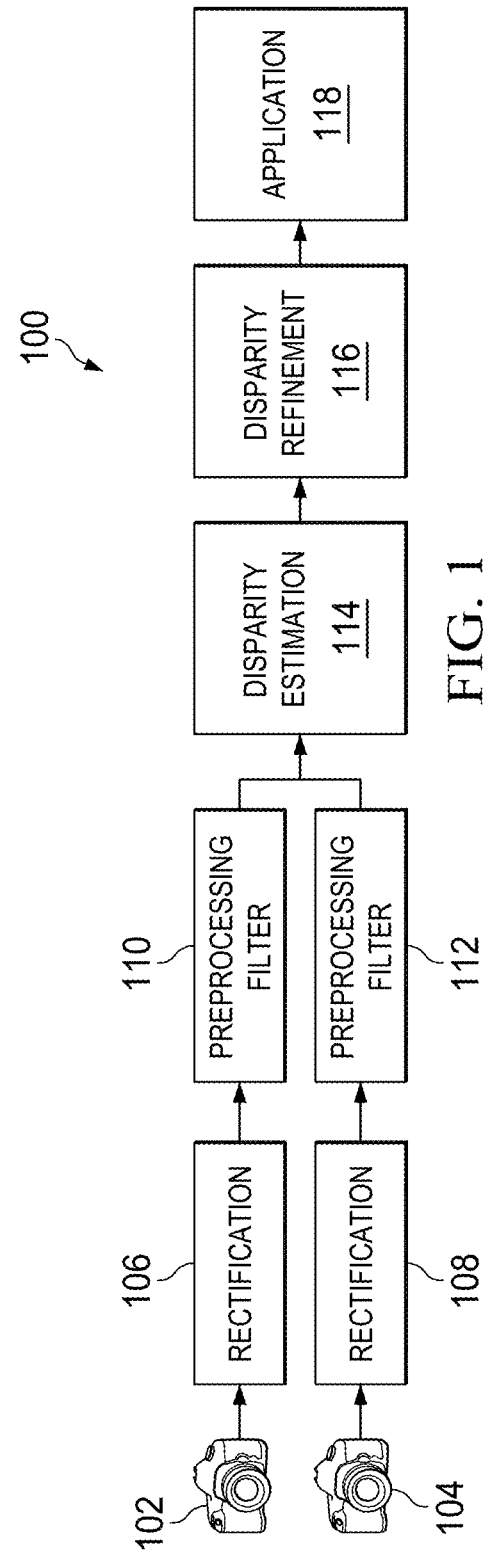
FIG. 1 is a block diagram of a stereo image processing system.

Specific embodiments of the invention will now be described in detail with reference to the accompanying figures. Like elements in the various figures are denoted by like reference numerals for consistency.

As previously mentioned, per-pixel algorithms used to refine disparity images can suppress ambiguous yet otherwise accurate disparity measurements by error. Some embodiments of the invention provide for using adaptively sized support regions, i.e., similarity regions, in a disparity image to suppress errors rather than attempting to suppress errors on a per-pixel basis as in the prior art. A non-local disparity smoothness metric is used that suppresses noise while preserving subtle structure in disparity images. This approach may be more accurate than at least some per-pixel de-noising techniques, and can be implemented at a low computation cost. Some embodiments of the invention provide for using a similar region-based approach to refine depth images.

FIG. 1 is a block diagram of a stereo image processing system 100. The system 100 includes left and right imaging components (cameras) 102, 104, two rectification components 106, 108, two preprocessing filter components 110, 112, a disparity estimation component 114, a disparity refinement component 116, and an application component 118. The components of the stereo image processing system 100 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory (not shown) and executed by one or more processors.

The left and right imaging components 102, 104 include imaging sensor systems arranged to capture image signals of a scene from a left viewpoint and a right viewpoint. That is, the imaging sensor system of the left imaging component 102 is arranged to capture an image signal from the left viewpoint, i.e., a left analog image signal, and the imaging sensor system of the right imaging component 104 is arranged to capture an image signal from the right view point, i.e., a right analog image signal. Each of the imaging sensor systems may include a lens assembly, a lens actuator, an aperture, and an imaging sensor. The imaging components 102, 104 also include circuitry for controlling various aspects of the operation of the respective image sensor systems, such as, for example, aperture opening amount, exposure time, etc. The imaging components 102, 104 also include functionality to convert the respective left and right analog image signals to left and right digital image signals, and to provide the left and right digital image signals to the respective rectification components 106, 108.

The rectification components 106, 108 process the respective left and right digital images to align the epipolar lines to be parallel with the scan lines of the images. This rectification is performed to compensate for camera distortions such as lens distortion, sensor tilting, and offset from the focal axis and for image planes that are not co-planar and/or not row aligned as the result of a non-ideal camera pair set up. Any suitable rectification techniques may be used, such as, e.g., bilinear interpolation or spline interpolation. The particular rectification processing performed may depend on the application 118 using the stereo images. Although not specifically shown, the rectified left and right images are also provided to the application component 118.

The preprocessing filter components 110, 112 filter the respective rectified left and right images to improve the images for the stereo matching process performed by the disparity estimation component 114. The filtering is performed to, for example, filter out the low frequency image signal that tends to capture undesired illumination and exposure differences between the left and right imaging components 102, 104, amplify the high frequency texture of the scene, and/or reduce the effects of image sensor noise. Any suitable filtering may be performed. For example, the Laplacian-of-Gaussian (LoG) filter as described in D. Marr and E. Hildreth, "Theory of Edge Detection," Proceedings of the Royal Society of London, Series B, Biological Sciences, Vol. 207, No. 1167, Feb. 29, 1980, pp. 187-217 (Marr herein), and efficient variants and approximations thereof such as those described in Soo-Chang Pei and Ji-Hwei Horng, "Design of FIR Bilevel Laplacian-of-Gaussian Filter," Signal Processing, Vol. 82, Issue 4, April 2002, pp. 677-691, may be used. Some other suitable techniques are described in U.S. patent application Ser. No. 13/647,449, entitled "Scene Adaptive Filter Design for Improved Stereo Matching," filed Oct. 9, 2012.

The disparity estimation component 114 receives the rectified, filtered left and right images and generates a disparity image of the stereo image. The disparity estimation component 114 may implement any suitable stereo correspondence algorithm for generation of the disparity image. Some suitable stereo correspondence algorithms are described in D. Scharstein and R. Szeliski, "A Taxonomy and Evaluation of Dense Two-Frame Stereo Correspondence Algorithms," International Journal of Computer Vision, Vol. 47, No. 1-3, April-June 2002, pp. 7-42. In some embodiments, the disparity estimation component 114 implements a local (window-based) stereo correspondence algorithm.

The disparity refinement component 116 performs processing to refine the disparity image as it is expected that some part of the disparity image may be incorrect. More specifically, the disparity refinement component performs a method for region-based refinement of the disparity image as described herein in reference to FIG. 2. The disparity refinement component 116 may also perform other refinement processing on the disparity image such as median filtering to smooth and remove irregularities such as outliers and small peaks and interpolation to remove small holes.

The application component 118 receives the disparity image and performs any additional processing needed for the particular application. The application component 118 may implement any application or applications that rely on a three-dimensional (3D) representation of a scene. For example, the application component 118 may be an automotive forward collision warning application that calculates how far an object is from the vehicle, tracks the object over time to determine if the vehicle is rapidly approaching it, and warns the driver of an impending collision. In another example, the application component 118 may be an automotive pedestrian detection application. In another example, the application component 118 may be a 3D video conference call application that supports background replacement. In another example, the application component 118 may be a 3D person tracking application. In another example, the application component 118 may be a 3D surveillance application.

Figure 2:
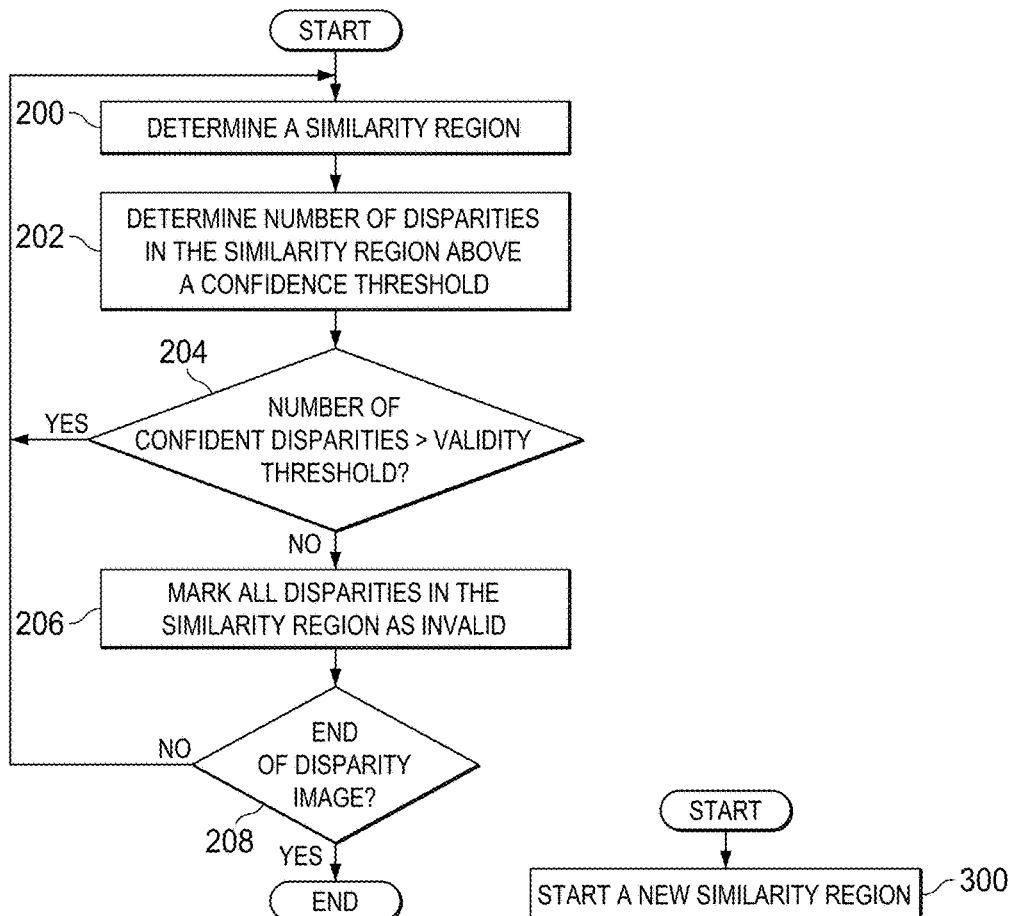
FIGS. 2 and 3 are flow diagrams of methods.

FIG. 2 is a flow diagram of a method for refining a disparity image. In general, the method applies a two level confidence metric to regions of similar disparity in a disparity image. If there is sufficient confidence across a similarity region, the disparities in the region are not changed. Otherwise, the disparities in the similarity region are considered to be invalid.

Initially, a similarity region is determined 200. Similarity regions in this context are non-overlapping regions of contiguous pixel disparities that are locally smooth and consistent. Any suitable image segmentation technique may be used for determining similarity regions. In some embodiments, the method of FIG. 3, which is a form of one-dimensional (1D) connected component analysis, is used. Other segmentation techniques that may be used to determine the similarity regions include, for example, multi-dimensional connected components, graph cuts, k-means clustering, and expectation maximization. Descriptions of some suitable techniques may be found in: L. Shafarenko and J. Kittler, "Automatic Watershed Segmentation of Randomly Textured Color Images," IEEE Transactions on Image Processing, Vol. 6, No. 11, November 1997, pp. 1530-1544, C. Carson, et al., "Blobworld: Image Segmentation using Expectation-Maximization and its Application to Image Querying," IEEE Transactions on Pattern Analysis and Machine Intelligence, Vol. 24, Issue 8, August 2002, pp. 1026-1038, Y. Boykov and G. Funka-Lea, "Graph Cuts and Efficient N-D Image Segmentation," International Journal of Computer Vision, Vol. 70, Issue 2, November 2006, pp. 109-131, and T. Pappas, "An Adaptive Clustering Algorithm for Image Segmentation," IEEE Transactions on Signal Processing, Vo. 40, No. 4, April 1992, pp. 901-914.

The number of pixel disparities in the similarity region that are above a confidence threshold is then determined 202. The value of the confidence threshold depends on the technique used to generate the disparity image. More specifically, when the disparity image is generated, a confidence measure is determined for each disparity. The confidence measure indicates how likely it is that the particular disparity is correct, i.e., how reliable the disparity is. Typically, the confidence measures are determined such that if the disparities were ranked in order of decreasing confidence, the disparities with the smallest confidence measures would be at the bottom. Some examples of confidence metrics that may be used are described in X. Hu and P. Mordohai, "Evaluation of Stereo Confidence Indoors and Outdoors," Computer Vision and Pattern Recognition, 2010 IEEE Conference on, Jun. 13-18, 2010, pp. 1466-1473.

In general, the confidence threshold value is set such that disparities with sufficiently high confidence metrics are counted and the rest are ignored. The value of the confidence threshold may vary based on camera parameters (e.g., resolution, focal length, the position and orientation, etc.), parameters of the matching algorithm used to generate the disparity image, the characteristics of the scene (e.g., lighting conditions, expected objects, image pre-processing or pre-filtering, etc.), etc. For example, for a typical automotive scene captured by a Point Grey Bumblebee XB3 camera at 1280×960 resolution in which a matching window size of 21×21 is used and curvature is used to compute the per-pixel confidence measure, a confidence threshold of curvature >150 has been demonstrated to provide a good balance for suppressing noisy disparities while retaining valid disparities.

The number of disparities with sufficient confidence is then compared 204 to a validity threshold to determine if there are sufficient high confidence disparities in the similarity region to assume that the disparities in the region are valid. The value of this validity threshold indicates the minimum number of high confidence disparities that should be present in a region. In some embodiments, this validity threshold is set to a value based on the particular combination of image resolution and camera focal length used to capture the stereo images as these factors affect the possible number of disparities in similarity regions. For example, for images from QVGA (320×240) to 1080p (1920×1080), the value of the validity threshold range from 5 high confidence disparities for the smallest resolution to 40 high confidence disparities for the highest resolution. Note that the use of a single validity threshold for all similarity regions regardless of the number of disparities in a region implies that, to be determined as valid, a region with a smaller number of disparities needs a larger percentage of high confidence disparities than a region with a larger number of disparities. For example, for a validity threshold of 5 high confidence disparities, all disparities (100%) in a 5-disparity region need confidence measures greater than or equal to 5, while only half of the disparities (50%) in a 10-disparity region need confidence measures greater than or equal to 5.

If there are not sufficient high confidence disparities in the region 204, then all of the disparities in the region are marked as invalid 206, and processing continues with the next similarity region, if any 208. If there are sufficient high confidence disparities in the region 204, then the region is left as is and processing continues with the next similarity region, if any 208. The disparities may be marked as invalid by, for example, setting each disparity to 0. Further, a disparity mask may be generated that indicates for each disparity in the disparity image whether or not the disparity is valid or invalid.

Figure 3:
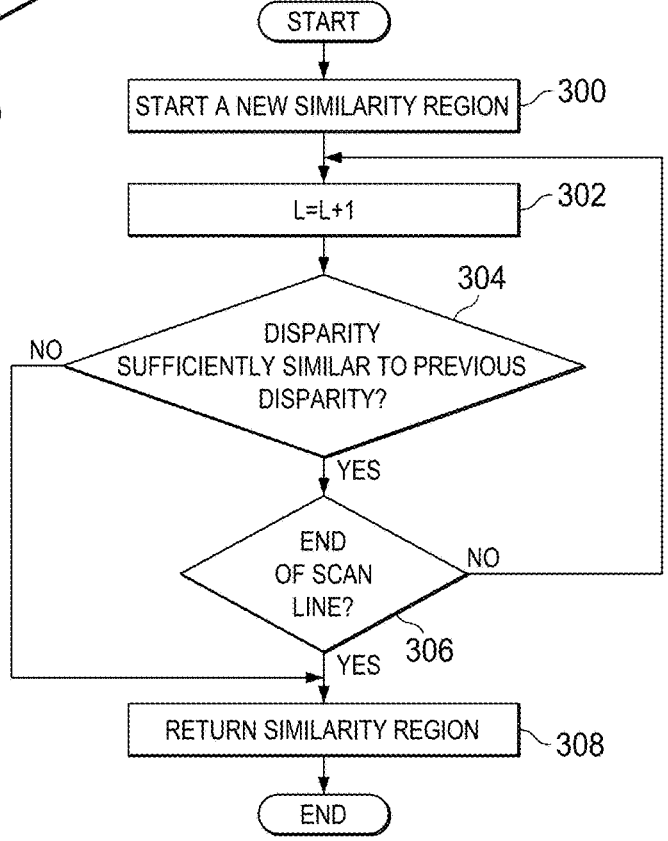

FIG. 3 is a flow diagram of a method for determining a similarity region in a disparity image that may be used by the method of FIG. 2. The method begins with the top left location in the disparity image, d(0,0), and processes the disparities line by line in left to right order to determine a 1D similarity region. For purposes of this description, L is the location in the current scan line of the disparity that will be at the beginning of a similarity region.

Initially, a new similarity region is started 300. The new similarity region begins with the top left location of the disparity image if a new image is being processed, i.e., L=0, or with the disparity location L that terminated the generation of the previous similarity region. The disparity location L is incremented to consider the next disparity location in the scan line. If the disparity at this location is sufficiently similar to the disparity of the previous location 304, the disparity is included in the similarity region; otherwise, processing stops and the current similarity region (which does not include the current disparity) is returned 308. Similarity may be determined, for example, by $|d_L - d_{L-1}| < T$ where T=1, $d_L$ is the current disparity, and $d_{L-1}$ is the previous disparity. If this condition is true, there is sufficient similarity.

If the current disparity is added to the similarity region, processing continues with the next disparity location 302 unless the end of the scan line has been reached 306. If the current disparity location is at the end of the scan line, processing is terminated and the current similarity region is returned 308. The location counter L is set to 0 for the next region determination.

Figure 4A:
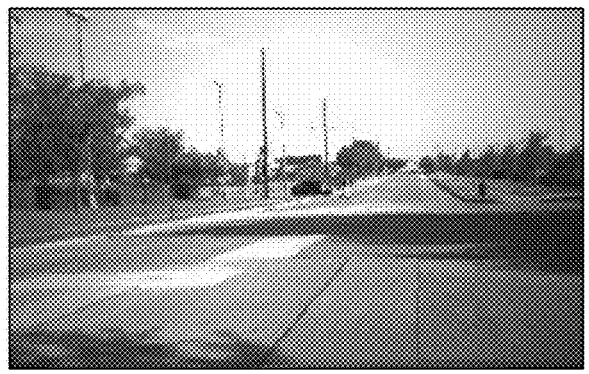
FIGS. 4A-4E and 5A-5E are examples.
Figure 4B:
Figure 4C:
Figure 4D:
Figure 4E:
Figure 5A:
Figure 5B:
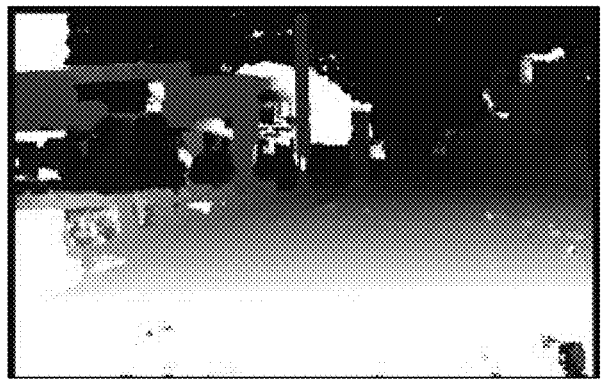
Figure 5C:

FIGS. 4A-4E and 5A-5E are examples illustrating the efficacy of this adaptive region-based approach for disparity image refinement as compared to per-pixel disparity image refinement. A curvature-based per-pixel filtering technique was used for the per-pixel disparity image refinement. For both the per-pixel filtering and the adaptive region-based filtering, invalid disparities were set to 0. FIGS. 4A and 5A show the original left image of a stereo image (a road scene under different lighting conditions), and FIGS. 4B and 5B show the corresponding unfiltered (unrefined) disparity images. FIGS. 4C and 5C show the results of per-pixel filtering of the respective disparity images using a low confidence threshold in which many questionable disparities were kept. Note that there are many erroneous disparities in the areas corresponding to the sky in the original left image and around the borders.

Figure 5D:
Figure 5E:

FIGS. 4D and 5D show the results of per-pixel filtering of the respective disparity images using a high confidence threshold. There are fewer erroneous disparities but correct disparities for the road have been removed. FIGS. 4E and 5E show the results of applying the region-based approach to the respective disparity images. As these examples illustrate, using the per-pixel filter with a low threshold keeps the structure, but also keeps a lot of noise. Using the per-pixel filter with a high threshold removes all the noise, but removes structure as well. The region-based approach removes the noisy disparities while keeping the important structure.

Figure 6:
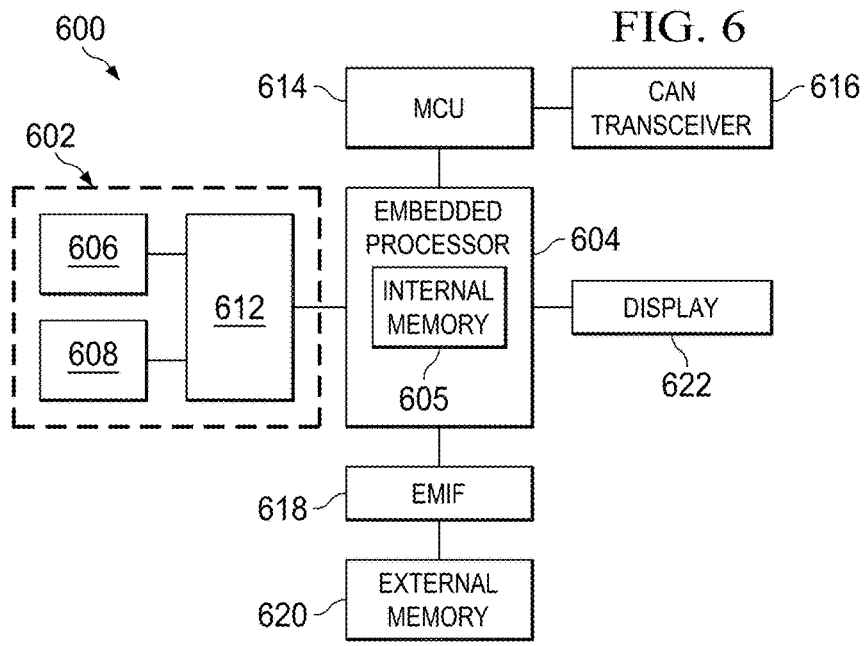
FIG. 6 is a block diagram of an automotive vision control system.

FIG. 6 is a block diagram of an embedded automotive vision control system 600 suitable for use in a vehicle that may be configured to perform adaptive region-based refinement of disparity images as described herein. The stereoscopic imaging system 602 includes left and right imaging components 606, 608 and a controller component 612 for capturing the data needed to generate a stereoscopic video sequence. The imaging components 606, 608 may be imaging sensor systems arranged to capture image signals of a scene from a left viewpoint and a right viewpoint. That is, the imaging sensor system in the left imaging component 606 may be arranged to capture an image signal from the left viewpoint, i.e., a left analog image signal, and the imaging sensor system in the right imaging component 608 may be arranged to capture an image signal from the right view point, i.e., a right analog image signal. Each of the imaging sensor systems includes a lens assembly, a lens actuator, an aperture, and an imaging sensor. The stereoscopic imaging system 602 also includes circuitry for controlling various aspects of the operation of the system, such as, for example, aperture opening amount, exposure time, etc. The controller module 612 includes functionality to convey control information from the embedded processor 604 to the imaging sensor systems 606, 608, to convert the left and right analog image signals to left and right digital image signals, and to provide the left and right digital image signals to the embedded processor 604 for further processing.

Software instructions implementing some or all the functionality of the rectification, preprocessing filtering, disparity estimation, and disparity refinement components of FIG. 1 may be stored in the external memory 620 and executed by the embedded processor to generate disparity images for the stereoscopic images received from the stereoscopic imaging system 602. Software instructions implementing a driver assistance application needing 3D vision information such as forward collision warning, visual parking, and/or navigation assistance, automatic braking control, etc., may also be stored in the external memory 620 and executed on the embedded processor. The software instructions for disparity refinement may implement an embodiment of the method for adaptive region-based refinement of a disparity image as described herein. The software instructions may be initially stored in a computer readable medium and loaded and executed by the embedded processor 604. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, random access memory, or a combination thereof.

The embedded processor 604 may be any suitable processor that provides the computation performance needed for stereo vision processing, such as, for example, a digital signal processor or a general purpose processor. The internal memory 605 may be any suitable memory design, e.g., static random access memory (SRAM). The embedded processor 604 is coupled to external memory 620 via an external memory interface (EMIF) 618. The embedded processor 604 included functionality to move instructions and/or data between the external memory 620 and the internal memory 605 via the EMIF 618 as needed for stereo image processing, e.g., generation of disparity images, and application processing.

The external memory 620 may be any suitable memory design may be used. For example, the external memory 620 may include DRAM such as synchronous DRAM (SDRAM) or double data rate DRAM (DDR DRAM), flash memory, a combination thereof, or the like.

The display 622 may be a display device capable of displaying stereo images or a display device capable of displaying two-dimensional images. In the latter case, images captured by one of the imaging components 102, 104 are displayed on the display 622. The information provided on the display depends on the particular application or applications of the system 600. For example, the display 622 may be used by a parking assistance application.

The microcontroller (MCU) 614 may be a general purpose microcontroller configured to handle system control functions such as steeper motors in real time as well as communication with other modules in the vehicle. The controller area network (CAN) transceiver provides a network protocol for serial communication with various control modules in the vehicle.

In operation, the embedded processor 604 may receive a sequence of left and right digital images of a stereo video sequence from the stereoscopic imaging system 602, execute software instructions stored in the external memory 605 to perform rectification, preprocessing filtering, disparity estimation, and disparity refinement as previously described herein to generate disparity images, and provide the disparity images to one or more driver assistance applications.

A driver assistance application may further process the disparity images to provide vision based assistance to a driver. For example, the driver assistance application may derive information about the scene from the disparity images that allows it to detect that a collision with an object is imminent. The driver assistance application may then communicate with the MCU 614 to request that the MCU 614 interact with a brake control module to slow the vehicle down and may also cause a visual alarm to be displayed on scene shown in the display 622 and/or cause an audible alarm to be initiated.

While the region-based refinement approach has been previously described herein in reference to disparity images generated by matching of corresponding 2D images, the approach is applicable to any imaging technology, e.g., time-of-flight and structured light, that generates images including depth information and provides a confidence measure for each pixel depth. The depth information may be in a separate image containing just the depth information or may be combined with color information in a single image. Both of these are referred to as a depth image herein.

Figure 7:
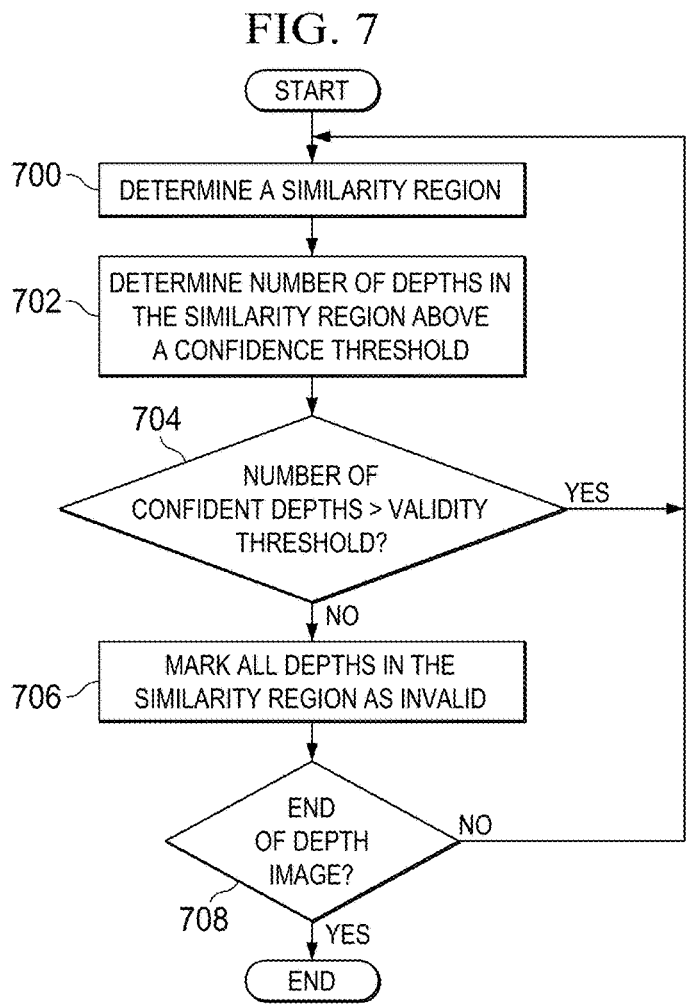
FIGS. 7 and 8 are flow diagrams of methods.

FIG. 7 is a flow diagram of a method for refining a depth image. For purposes of applying the region-based refinement, if a depth image includes color information, the refinement is applied to the depth information and the color information is not changed. In general, the method applies a two level confidence metric to regions of similar depth in a depth image. If there is sufficient confidence across a similarity region, the depths in the region are not changed. Otherwise, the depths in the similarity region are considered to be invalid.

Initially, a similarity region is determined 700. Similarity regions in this context are non-overlapping regions of contiguous pixel depths that are locally smooth and consistent.

Any suitable image segmentation technique may be used for determining similarity regions. In some embodiments, the method of FIG. 8, which is a form of one-dimensional (1D) connected component analysis, is used. Other segmentation techniques that may be used to determine the similarity regions include, for example, multi-dimensional connected components, graph cuts, k-means clustering, and expectation maximization.

The number of pixel depths in the similarity region that are above a confidence threshold is then determined 702. The value of the confidence threshold depends on the technique used to generate the depth image. More specifically, when the depth image is generated, a confidence measure is determined for each depth. The confidence measure indicates how likely it is that the particular depth is correct, i.e., how reliable the depth is. Typically, the confidence measures are determined such that if the depths were ranked in order of decreasing confidence, the depths with the smallest confidence measures would be at the bottom.

In general, the confidence threshold value is set such that depths with sufficiently high confidence metrics are counted and the rest are ignored. The value of the confidence threshold may vary based on depth sensor parameters (e.g., resolution, focal length, position and orientation, etc.), parameters of the matching algorithm used to generate the depth image, the characteristics of the scene (e.g., lighting conditions, expected objects, image pre-processing or pre-filtering, etc), etc.

The number of depths with sufficient confidence is then compared 704 to a validity threshold to determine if there are sufficient high confidence depths in the similarity region to assume that the depths in the region are valid. The value of this validity threshold indicates the minimum number of high confidence depths that should be present in a region. In some embodiments, this validity threshold is set to a value based on the particular combination of image resolution and focal length used to capture the depth images as these factors affect the possible number of depths in similarity regions.

If there are not sufficient high confidence depths in the region 704, then all of the depths in the region are marked as invalid 706, and processing continues with the next similarity region, if any 708. If there are sufficient high confidence depths in the region 704, then the region is left as is and processing continues with the next similarity region, if any 708. The depths may be marked as invalid by, for example, setting each depth to 0. Further, a depth mask may be generated that indicates for each depth in the depth image whether or not the depth is valid or invalid.

Figure 8:
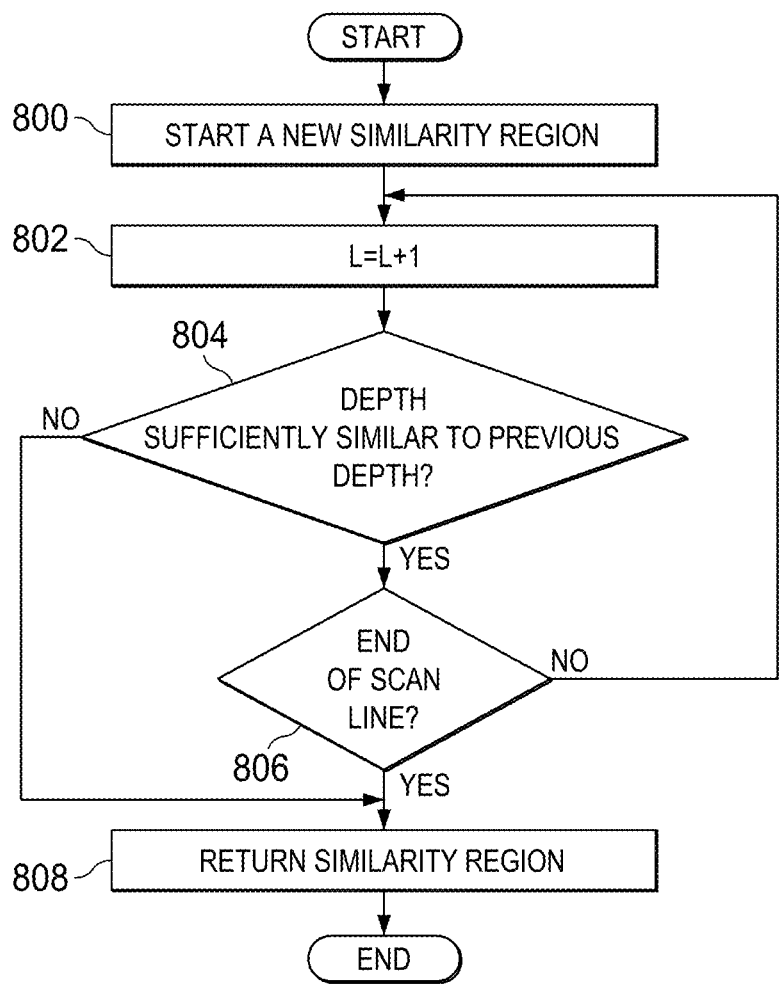

FIG. 8 is a flow diagram of a method for determining a similarity region in a depth image that may be used by the method of FIG. 7. The method begins with the top left location in the depth image, d(0,0), and processes the depths line by line in left to right order to determine a 1D similarity region. For purposes of this description, L is the location in the current scan line of the depth that will be at the beginning of a similarity region.

Initially, a new similarity region is started 800. The new similarity region begins with the top left location of the depth image if a new image is being processed, i.e., L=0, or with the depth location L that terminated the generation of the previous similarity region. The depth location L is incremented to consider the next depth location in the scan line. If the depth at this location is sufficiently similar to the depth of the previous location 804, the depth is included in the similarity region; otherwise, processing stops and the current similarity region (which does not include the current depth) is returned 808. Similarity may be determined, for example, by $|d_L - d_{L-1}| < T$ where T=1, $d_L$ is the current depth, and $d_{L-1}$ is the previous depth. If this condition is true, there is sufficient similarity.

If the current depth is added to the similarity region, processing continues with the next depth location 802 unless the end of the scan line has been reached 806. If the current depth location is at the end of the scan line, processing is terminated and the current similarity region is returned 808. The location counter L is set to 0 for the next region determination.

The similarity region-based voting approach to determining the overall validity (confidence) of a region in a disparity image or density image as described herein is an improvement over prior art local or component based metrics as it operates on regions that are generally consistent with objects in real world scenes. That is, each similarity region has a number of disparities/densities with different confidence scores. There are different ways to determine the overall validity of the region. For example, the validity could be determined as the sum of confidence measures, or the mean or median of the confidence measures, or by fitting a Gaussian to the confidence measures. But these techniques tend to overweight the low-confidence disparities/depths. In contrast, the voting approach ignores the low-confidence disparities/depths and instead looks for a sufficient number of high-confidence disparities/depths to "support" the region.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, some embodiments of the invention have been described herein assuming stereo video. Stereo video is just one example of 3D multi-view video. In general, 3D multi-view video includes two or more corresponding 2D video sequences of a scene captured by two or more cameras concurrently in differing locations. One of ordinary skill in the art, having benefit of this disclosure, will understand embodiments in which the region-based disparity refinement may be applied to multi-view video. For example, a multi-view image processing system may include more than two imaging components. The processing flow of FIG. 1 may be performed on video sequences from each pair of adjacent imaging components to generate disparity images during which the disparity refinement described herein is applied to the disparity images generated for each video sequence pairing.

In another example, the validity threshold of FIG. 2 and FIG. 7 is described as being a fixed number. In some embodiments, this threshold may vary with the degree of confidence. For example, a curve, e.g., quadratic, sigmoid, or exponential, can be used to create a soft count, based on confidence. This would allow a region supported by a few very confident disparities/depths to be equally as valid as one supported by many somewhat confident disparities/depths. That is, such weighting would require a greater number of confident disparities/depths as the confidence measures for the disparities/depths decreases. For example, a region with 5 extremely confident disparities/depths might be acceptable, as might a region with 10 very confident disparities/depths, or 15 somewhat confident disparities/depths.

In another example, rather than performing rectification, preprocessing filtering, and disparity selection in parallel as depicted herein, theses operations may be performed serially. For example, there may be a single rectification component and a single preprocessing filter component for rectifying and filtering the left and right images.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A computer implemented method for three dimensional (3D) image processing, the method comprising:
   receiving an image and a plurality of confidence measures, the image including a plurality of values, wherein each of the values in the image is indicative of a depth of a respective one of a plurality of pixels in a scene, and wherein each of the values is associated with a respective one of the confidence measures;
   determining a plurality of non-overlapping similarity regions based on the confidence measures;
   determining whether each of the similarity regions has a threshold number of values with corresponding confidence measures that are greater than a confidence threshold;
   refining a similarity region of the image in response to determining that the similarity region has the threshold number of the values with corresponding confidence measures that are greater than the confidence threshold; and
   not refining the similarity region of the image in response to determining that the similarity region does not have the threshold number of the values with corresponding confidence measures that are greater than the confidence threshold.

2. The method of claim 1, wherein similarity of values in the similarity region is determined by a similarity threshold.

3. The method of claim 1, wherein the similarity region consists of a sequence of similar values from one scan line of the image, a similarity of adjacent values in the sequence determined by a similarity threshold.

4. The method of claim 1, further comprising:
   determining the number of values in the similarity region having a sufficiently high confidence measure; and
   determining that the similarity region is valid when the number of values is sufficient to support validity of the similarity region, wherein a sufficient number of values is determined by a validity threshold.

5. The method of claim 1, wherein the image is one selected from a group consisting of a disparity image and a depth image, wherein when the image is a disparity image, a value is a disparity and when the image is depth image, a value is a depth.

6. The method of claim 5, wherein the image is a disparity image, and wherein the method further comprises indicating in a disparity mask that the values are not valid.

7. The method of claim 4, wherein the image is a disparity image and the validity threshold is based on a resolution and a focal length of imaging components used to capture two-dimensional images for which the disparity image was generated.

8. The method of claim 5, wherein the image is a disparity image and the values are disparities computed for corresponding left and right images of a stereoscopic video sequence.

9. An apparatus configured to perform three dimensional (3D) image processing, the apparatus comprising one or more processors configure to:
   receive an image and a plurality of confidence measures, the image including a plurality of values, wherein each of the values in the image is indicative of a depth of a respective one of a plurality of pixels in a scene, and wherein each of the values is associated with a respective one of the confidence measures;
   determine a plurality of non-overlapping similarity regions based on the confidence measures;
   determine whether each of the similarity regions has a threshold number of values with corresponding confidence measures that are greater than a confidence threshold;
   refine a similarity region of the image in response to determining that the similarity region has the threshold number of the values with corresponding confidence measures that are greater than the confidence threshold; and
   not refine the similarity region of the image in response to determining that the similarity region does not have the threshold number of the values with corresponding confidence measures that are greater than the confidence threshold.

10. The apparatus of claim 9, wherein similarity of values in the similarity region is determined by a similarity threshold.

11. The apparatus of claim 9, wherein the similarity region consists of a sequence of similar values from one scan line of the image, a similarity of adjacent values in the sequence determined by a similarity threshold.

12. The apparatus of claim 9, wherein the one or more processors are further configured to:
   determine the number of values in the similarity region having a sufficiently high confidence measure; and
   determine that the similarity region is valid when the number of values is sufficient to support validity of the similarity region, wherein a sufficient number of values is determined by a validity threshold.

13. The apparatus of claim 9, wherein the image is one selected from a group consisting of a disparity image and a depth image, wherein when the image is a disparity image, a value is a disparity and when the image is depth image, a value is a depth.

14. The apparatus of claim 13, wherein the image is a disparity image, and the one or more processors are further configured to indicate in a disparity mask that the values are not valid.

15. The apparatus of claim 12, wherein the image is a disparity image and the validity threshold is based on a resolution and a focal length of imaging components used to capture two-dimensional images for which the disparity image was generated.

16. The apparatus of claim 13, wherein the image is a disparity image and the values are disparities computed for corresponding left and right images of a stereoscopic video sequence.

17. A non-transitory computer readable medium comprising instructions that, when executed by a processor, cause the processor to:
- receive an image and a plurality of confidence measures, the image including a plurality of values, wherein each of the values in the image is indicative of a depth of a respective one of a plurality of pixels in a scene, and wherein each of the values is associated with a respective one of the confidence measures;
- determine a plurality of non-overlapping similarity regions based on the confidence measures;
- determine whether each of the similarity regions has a threshold number of values with corresponding confidence measures that are greater than a confidence threshold;
- refine a similarity region of the image in response to determining that the similarity region has the threshold number of the values with corresponding confidence measures that are greater than the confidence threshold; and
- not refine the similarity region of the image in response to determining that the similarity region does not have the threshold number of the values with corresponding confidence measures that are greater than the confidence threshold.

18. The method of claim 1, wherein determining whether each of the similarity regions has the threshold number of values includes:
- determining whether each of the confidence values for each of the values in the respective similarity region is greater than the confidence threshold; and
- determining whether a number of values in the respective similarity region that have confidence values greater than the confidence threshold is greater than a validity threshold.

* * * * *